United States Patent
Wang

(10) Patent No.: US 7,184,761 B1
(45) Date of Patent: Feb. 27, 2007

(54) SATELLITE COMMUNICATIONS SYSTEM

(75) Inventor: Arthur W. Wang, Buena Park, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 09/536,275

(22) Filed: Mar. 27, 2000

(51) Int. Cl.
*H04Q 7/20* (2006.01)

(52) U.S. Cl. .................. 455/427; 455/12; 455/429; 455/430; 455/431; 342/372

(58) Field of Classification Search .............. 455/11.2, 455/12.1, 13.1, 427, 428, 429, 430, 431; 342/372, 357.01, 356; 244/158
See application file for complete search history.

(56) References Cited

U.S. PATENT DOCUMENTS

| | | | |
|---|---|---|---|
| 3,497,807 A | 2/1970 | Newton | |
| 4,126,865 A | 11/1978 | Longhurst et al. | |
| 4,689,625 A | * 8/1987 | Barmat | 342/353 |
| 4,691,882 A | 9/1987 | Young | |
| 4,809,935 A | 3/1989 | Draim | |
| 4,819,002 A | 4/1989 | Reboullet | |
| 4,875,052 A | 10/1989 | Anderson et al. | |
| 5,075,682 A | 12/1991 | Dehnert | |
| 5,077,561 A | 12/1991 | Gorton et al. | |
| 5,117,240 A | * 5/1992 | Anderson et al. | 343/786 |
| 5,119,225 A | 6/1992 | Grant et al. | |
| 5,120,007 A | 6/1992 | Pocha et al. | |
| 5,151,706 A | * 9/1992 | Roederer et al. | 342/372 |
| 5,326,054 A | 7/1994 | Turner | |
| 5,439,190 A | 8/1995 | Horstein et al. | |
| 5,473,601 A | 12/1995 | Rosen et al. | |
| 5,551,624 A | 9/1996 | Horstein et al. | |
| 5,553,816 A | 9/1996 | Perrotta | |
| 5,561,837 A | 10/1996 | Muller et al. | |
| 5,619,211 A | * 4/1997 | Horkin et al. | 342/352 |
| 5,641,134 A | 6/1997 | Vatt | |
| 5,655,005 A | 8/1997 | Wiedeman et al. | |
| 5,669,585 A | 9/1997 | Castiel et al. | |
| 5,678,175 A | 10/1997 | Stuart et al. | |
| 5,736,959 A | 4/1998 | Patterson et al. | 342/354 |
| 5,738,309 A | 4/1998 | Fowell | |
| 5,765,098 A | 6/1998 | Bella | |
| 5,788,187 A | * 8/1998 | Castiel et al. | 244/158 R |
| 5,793,813 A | 8/1998 | Cleave | |
| 5,805,067 A | * 9/1998 | Bradley et al. | 340/552 |

(Continued)

FOREIGN PATENT DOCUMENTS

EP  0 792 799 A2  3/1997

(Continued)

OTHER PUBLICATIONS

Anonymous: "Orbital Plans High-Capacity 'Space Cable' Global Satellite Network"—Press Release, Sep. 25, 1997, XP002132567.

(Continued)

*Primary Examiner*—Erika A. Gary
*Assistant Examiner*—David Q. Nguyen
(74) *Attorney, Agent, or Firm*—Georgann S. Grunebach

(57) ABSTRACT

A communication system has a plurality of ground stations for communicating communication signal to a plurality of satellites located in an inclined elliptical sub-geosynchronous orbit with respect to the earth. The plurality of satellites operate in a service area in a synchronized manner to provide continuous coverage to the service area. The satellites generate a plurality of beams with variable beamwidths to obtain a substantially uniform cell size covering the service area. A user terminal within the service area receives communication signals from the satellite.

32 Claims, 9 Drawing Sheets

U.S. PATENT DOCUMENTS

| | | | |
|---|---|---|---|
| 5,810,292 A | 9/1998 | Garcia et al. | |
| 5,810,297 A | 9/1998 | Basuthakur et al. | |
| 5,845,206 A | 12/1998 | Castiel et al. | |
| 5,867,783 A * | 2/1999 | Horstein et al. | 455/12.1 |
| 5,871,181 A | 2/1999 | Mass | |
| 5,884,866 A | 3/1999 | Steinmeyer et al. | |
| 5,918,157 A | 6/1999 | Wiedeman et al. | |
| 5,930,680 A | 7/1999 | Lusignan | |
| 5,931,417 A | 8/1999 | Castiel | |
| 5,940,739 A | 8/1999 | Conrad et al. | |
| 5,957,409 A | 9/1999 | Castiel et al. | |
| 5,961,077 A | 10/1999 | Koppel et al. | |
| 5,971,324 A | 10/1999 | Williams et al. | |
| 5,979,830 A | 11/1999 | Kellermeier | |
| 5,979,832 A | 11/1999 | Draim | |
| 5,990,883 A * | 11/1999 | Byrne et al. | 345/719 |
| 5,991,279 A | 11/1999 | Haugli | |
| 5,999,797 A | 12/1999 | Zancho et al. | |
| 6,007,027 A * | 12/1999 | Diekelman et al. | 244/158 R |
| 6,019,318 A | 2/2000 | Cellier et al. | |
| 6,059,233 A | 5/2000 | Koppel et al. | |
| 6,073,011 A | 6/2000 | Horstein | |
| 6,116,545 A | 9/2000 | Salvatore et al. | |
| 6,122,596 A | 9/2000 | Castiel | |
| 6,126,116 A | 10/2000 | Cellier | |
| 6,135,389 A | 10/2000 | Fowell | |
| 6,149,103 A | 11/2000 | Salvatore | |
| 6,175,719 B1 * | 1/2001 | Sarraf et al. | 455/13.1 |
| 6,198,907 B1 | 3/2001 | Torkington et al. | |
| RE37,140 E * | 4/2001 | Schloemer | 455/12.1 |
| 6,219,617 B1 * | 4/2001 | Dreischer et al. | 342/355 |
| 6,223,019 B1 | 4/2001 | Briskman et al. | |
| 6,229,500 B1 * | 5/2001 | Caille et al. | 343/753 |
| 6,257,526 B1 * | 7/2001 | Taormina et al. | 244/158 R |
| 6,263,188 B1 * | 7/2001 | Castiel et al. | 455/13.1 |
| 6,325,332 B1 | 12/2001 | Cellier et al. | |
| 6,327,523 B2 * | 12/2001 | Cellier | 244/158 R |
| 6,333,924 B1 * | 12/2001 | Porcelli et al. | 370/331 |
| 6,336,612 B1 | 1/2002 | Taormina et al. | |
| 6,339,707 B1 * | 1/2002 | Wainfan et al. | 455/427 |
| 6,389,336 B2 | 5/2002 | Cellier | |
| 6,460,808 B2 | 10/2002 | Taormina et al. | |
| 6,515,617 B1 * | 2/2003 | Demers et al. | 342/357.01 |
| 6,564,053 B1 | 5/2003 | Briskman et al. | |
| 6,684,056 B1 | 1/2004 | Emmons et al. | |
| 6,778,810 B1 | 8/2004 | Anderson | |
| 6,813,492 B1 * | 11/2004 | Hammill et al. | 455/429 |
| 2001/0012759 A1 | 8/2001 | Castiel et al. | |
| 2002/0160710 A1 * | 10/2002 | Castiel et al. | 455/12.1 |

FOREIGN PATENT DOCUMENTS

| | | |
|---|---|---|
| EP | 0 959 573 A2 | 11/1999 |
| WO | WO 98/51022 | 11/1998 |

OTHER PUBLICATIONS

Thiel, A.K.: "Medium Altitude Phased Orbit Satellite Systems" Conference Proceedings Winter Convention on Military Electronics, Jan. 1, 1965, pp. 17-24; p. 21 right-hand column—p. 22-left hand column.

Logsdon: "Mobile Communication Satellites" 1995, XP002132568; pp. 156-157, 208-209 and p. 223.

Chiba, Isamu, "Inclined Geo Satellite Communication System With Deployable Phased Array Antennas" AIAA—98-1254, pp. 243-249.

Radio Communication Study Groups—"Effects of NGSO Provisional EPFD, APFD Limits on 'Quasi-Geostationary' Systems", Jun. 25, 1998, pp. 1-14.

US 5,415,368, 05/1995, Horstein et al. (withdrawn)

* cited by examiner

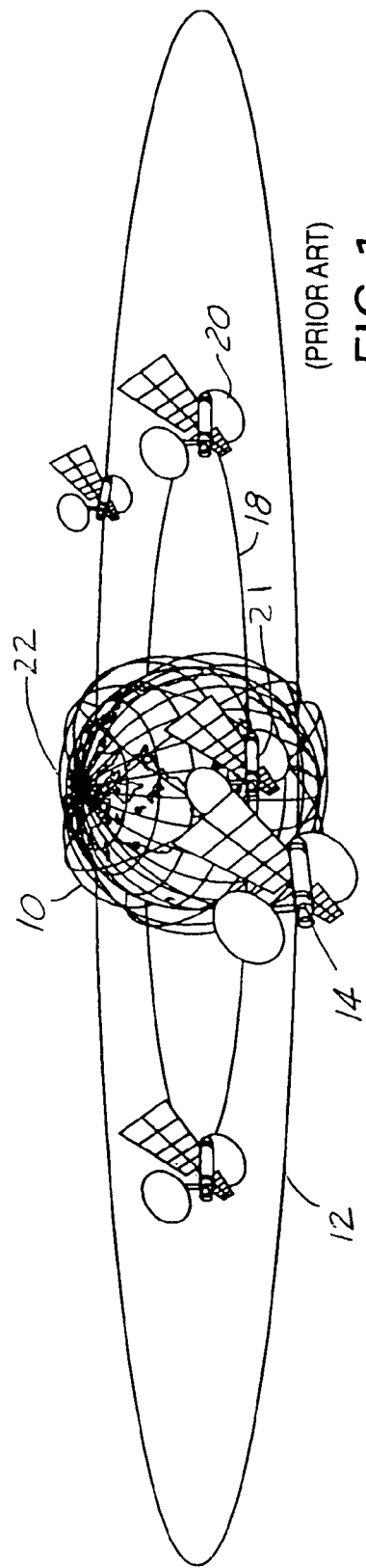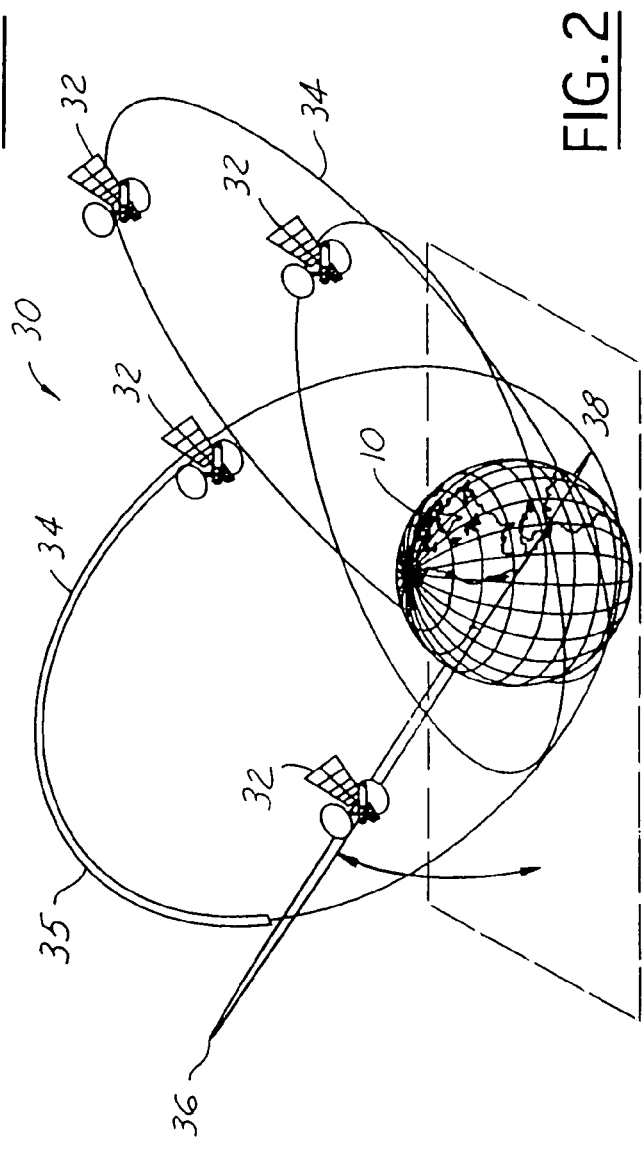
FIG.1 (PRIOR ART)
FIG.2

| 1 CASE | 2 NUMBER OF TOTAL SATELLITES [X] | 3 NUMBER OF ACTIVE SATELLITES [K] | 4 ORBIT PERIOD PERCENTAGE (% OF SIDEREAL DAY S) [1/M*100%] | 5 ACTIVE PERIOD PERCENTAGE (% OF SIDEREAL DAY S) [K/X*100%] | 6 EXAMPLE ORBIT PARAMETERS I (INCLINATION) & E (ECCENTRICITY) | 7 COVERAGE FEATURES (REF. SHOWN BELOW) | 8 REFERENCE FIGURE |
|---|---|---|---|---|---|---|---|
| 1 | 2 | 1 | 100% (M = 1) | 50% (~12 HOURS) | I (50°), E (0.1) | R*, HE* | FIGURE 5 |
| 2 | 3 | 1 | 100% (M = 1) | 33% (~8 HOURS) | I (50°), E (0.13) | R*, EHE* | FIGURE 6 |
| 3 | 3 | 2 | 50% (M = 2) | 66% (~16 HOURS) | I (40°), E (0.3) | PM* | FIGURE 7 |
| 4 | 4 | 2 | 50% (M = 2) | 50% (~12 HOURS) | I (40°), E (0.3) | PM* | |
| 5 | 4 | 3 | 33% (M = 3) | 75% (~18 HOURS) | I (16°), E (0.66) | G*, LO* | FIGURE 8 |
| 6 | 5 | 3 | 33% (M = 3) | 60% (14.4 HOURS) | I (35°), E (0.66) | G*, PM* | |
| 7 | 6 | 3 | 33% (M = 3) | 50% (12 HOURS) | I (35°), E (0.66) | G* | |
| 8 | 5 | 4 | 25% (M = 4) | 80% (~19.2 HOURS) | I (35°), E (0.58) | G* | FIGURE 7 |
| 9 | 6 | 4 | 25% (M = 4) | 66% (~16 HOURS) | I (35°), E (0.58) | G* | |
| 10 | 7 | 4 | 25% (M = 4) | 57% (~13.7 HOURS) | I (35°), E (0.58) | G* | |
| 11 | 8 | 4 | 25% (M = 4) | 50% (12 HOURS) | I (35°), E (0.58) | G* | |

*R: REGIONAL, HE: HIGH ELEVATION, EH: EXTREMELY HIGH ELEVATION, G: GLOBAL, LO: LANDMASS OPTIMIZED, AND PM: PRIMARY MARKET

FIG. 4

SATELLITE COMMUNICATIONS SYSTEM

TECHNICAL FIELD

The present invention relates generally to a satellite communications system and, more particularly, to a satellite system having satellites to provide continuous near global coverage with few satellites in elliptical sub-geosynchronous orbit.

BACKGROUND OF THE INVENTION

Satellites in geostationary orbit (GSO) have been widely preferred for several decades because of the economic advantages afforded by such orbit. In a geostationary orbit, a satellite traveling above the Earth's equator, in the same direction as that in which the Earth is rotating, and at the same angular velocity, appears stationary relative to a point on the Earth. These satellites are always "in view" at all locations within their service areas, so their utilization efficiency is effectively 100 percent. Antennas at Earth ground stations need be aimed at a GSO satellite only once; no tracking system is required.

Coordination between GSO's and with terrestrial services is facilitated by governmental allocation of designated "slots" spatially spaced according to service type. Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

This has encouraged the development of complex and expensive new systems including those using low Earth orbits (LEO's), medium Earth orbits (MEO's), and/or higher frequencies, for example, the Ka band (up to approximately 40 GHz). Proposed LEO and MEO applications have circular based orbits. Growth to higher frequencies is limited by problems of technology and propagation, and expansion in satellite applications requires exploitation of the spatial dimension (i.e., above and below the GSO belt). A host of proposed LEO and MEO systems exemplify this direction. A drawback of LEO and MEO systems for users is the relative uncertainty of satellite position, and rapid motion, leading typically to the use of omni-directional antennas having low gain, which limits data rate. Another drawback is that they must be designed not to interfere with previously deployed, currently constructed, or future planned GSO satellite systems. This may require cycling the satellite off and on during flight into the beam of a GSO satellite.

Typical LEO and MEO systems with relatively low altitude circular orbit constellations require a large number of satellites for coverage at a specified elevation angle to a single service area. The drawback to the large number of satellites is that several launches must be used to deploy the satellites. This increases the cost of the system dramatically.

Another known proposed system is the so called "Virtual GSO" (VGSO) by Virtual Geosatellite LCC. The VGSO system is a non-geostationary orbit system. The proposed VGSO requires 15 satellites to achieve global landmass coverage and wide separation away from GSO satellites. The main drawback to this system is that 15 satellites are required to achieve coverage. In many instances this may be cost prohibitive for a preliminary system.

Similar to VGSO system, another known system is a non-geostationary orbit system called "Denali" by Denali Telecom. The proposed system requires 3 satellites to achieve initial non-global coverage and 9 satellites to achieve the final global landmass coverage. Satellites in both initial and final deployment have a wide separation away from GSO satellites. The main drawback to this system is that 9 satellites are required to achieve global coverage. Yet another known system is the "West" system by the European Space Agency. The West system has nine satellites with the same ground track on Earth surface. The nine satellites are disposed in nine individual circular orbits whose ground tracks follow the same pattern that provides focused coverage at three highly populated regions, US, Europe, and East Asia. Drawbacks of this system are that its coverage is not optimized for landmass coverage and its coverage is not a near global.

While the various prior systems function relatively satisfactorily and efficiently, none discloses the advantages of a satellite system using overhead elliptical, eccentric sub-geosynchronous satellite orbits in accordance with the present invention as is hereinafter more fully described.

DISCLOSURE OF THE INVENTION

The present invention provides a satellite system that takes advantage of elliptical eccentric sub-geosynchronous orbits to achieve a relatively low cost satellite service with low investment particularly suitable for early entry into broadband consumer markets.

The present invention also provides a satellite system with continuous coverage of the service area using a synchronized set of satellites. The system can be configured to provide coverage at predetermined elevation angles. The present invention also provides a system having optimized land coverage to reduce the number of satellites to provide a desired level of coverage.

In one aspect of the invention, a communications system has a ground station for communicating communication signal to a plurality of satellites located in a specific inclined elliptical orbits with respect to the earth. The plurality of satellites operate in a service area in a synchronized manner, with identical ground tracks and consistent phasing, to provide continuous coverage to the service area. The satellites generate a plurality of beams with variable beamwidths to obtain a substantially uniform cell size covering the service area. A user terminal within the service area receives communication signals from the satellites.

One feature of the present invention is that the plurality of satellites providing an initial system capacity with minimum time-to-market and investment risk. The capacity can be easily supplemented with more satellites as the desire for system capacity increases.

In a further aspect of the invention, a method of providing a system of inclined eccentric sub-geosynchronous satellite orbits includes the steps of:

defining at least one geographic service area within which satellite coverage is to be provided, said service area having a minimum elevation angle thereabove;

defining at least two satellite orbits above the minimum service area having a first satellite and a second satellite respectively therein;

operating said first satellite to generate a plurality of fixed cells relative to the earth by varying the beam width and steering the boresight of the beams generated during operation in an active arc of an orbit;

handing over operation from the first satellite to the second satellite to maintain at least the minimum elevation angle; and operating said second satellite to generate the plurality of fixed cells by varying the beam width and steering the boresight of the beams generated during operation in the active arc of an orbit.

An advantage is that the satellite system provides continuous coverage by having at least a predetermined elevation angle that allows the use of the system in a majority of the coverage area. This elevation angle covers the most highly populated areas. The elevation angle may for example be about 30 degrees. Another advantage of the invention is that the tracking angles from the Earth stations or user terminals are relatively small compared with LEO and MEO systems.

The objects, advantages and features of the present invention are readily apparent from the following detailed description of the best mode for carrying out the invention when taken in connection with the accompanying drawings and appended claims.

BRIEF DESCRIPTION OF THE DRAWINGS

A more complete appreciation of the invention and many of the attendant advantages and features thereof may be readily obtained by reference to the following detailed description when considered with the accompanying drawings in which like reference characters indicate corresponding parts in all the views, wherein:

FIG. 1 is a perspective view of a LEO, a MEO and a GSO satellites of the prior art.

FIG. 2 is a perspective view of an inclined elliptic sub-geosynchronous orbit according to the present invention.

FIG. 4 is a chart illustrating various satellite constellations according to the present invention.

DESCRIPTION OF THE PREFERRED EMBODIMENT(S)

Figure 3:
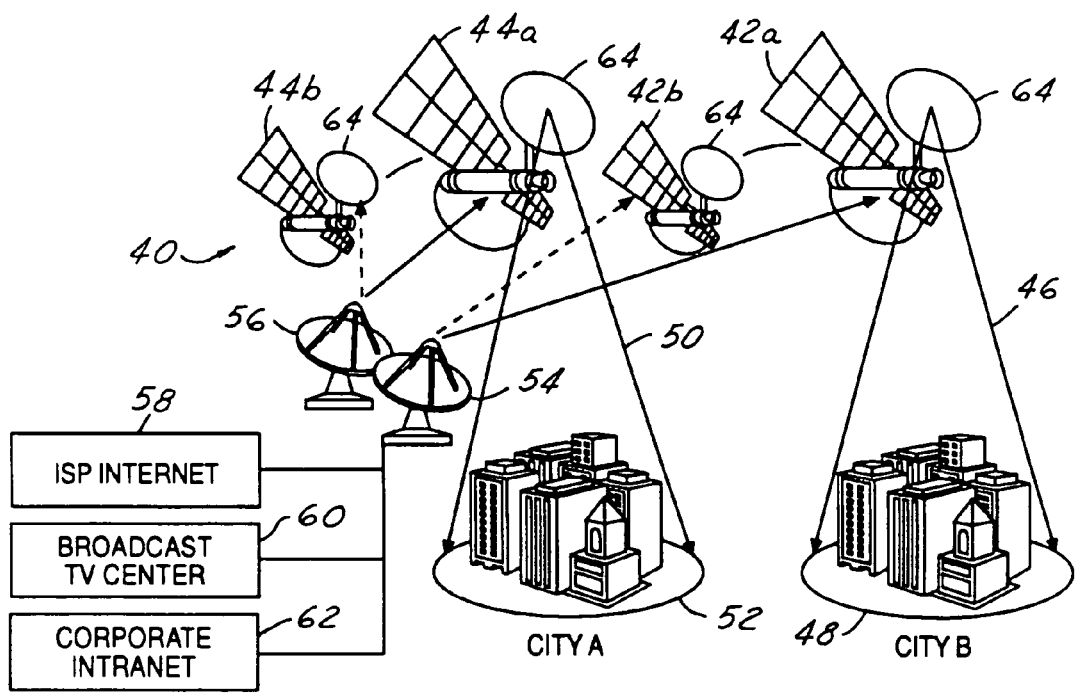
FIG. 3 is a perspective view of two cells in a service areas according to the present invention.

The present invention is illustrated herein in terms of a satellite orbit system using various inclination angles, eccentricity values and other values. It should be understood that specific numerical values are introduced as examples and not as final design values. Also, the preferred embodiment includes one satellite per orbit. However, more than one satellite could be employed.

The essence of the invention is the establishment of a satellite communication system that employs satellites that allow satellite communications for various types of services including mobile and fixed satellite coverage. The satellite system has inclined, eccentric sub-geosynchronous orbits with identical repeating ground tracks.

In the present invention, inclined elliptic sub-geosynchronous orbits (SGSO) satellites with altitudes below the geosynchronous-belt enable operation to service for a predetermined service region on a landmass with possible spectrum re-use of frequencies with the geostationary belt in a non-blocking manner. The SGSO system is non-geosynchronous as well in that they do not have a sidereal day period. The overall optimization in land coverage may be obtained with a few satellites. This reduces the cost and time-to-market of the system.

Referring now to FIG. 1, Earth 10 is shown having prior known type of systems. These systems include a geostationary (GSO) orbit 12 that has a GSO satellite 14. The GSO orbit 12 is a circular orbit at the equatorial plane. In a geostationary orbit, the satellite 14 travels above the Earth's equator, in the same direction as that in which the Earth is rotating, and at the same angular velocity, appears stationary relative to a point on the Earth. These satellites are always "in view" at all locations within their service areas, so their utilization efficiency is effectively 100 percent. Antennas at Earth ground stations need be aimed at a GSO satellite only once; no tracking system is required. GSO satellite 14 is positioned at about 35,000 kilometers above Earth 10.

Earth 10 is also shown with a medium earth orbit (MEO) satellite 20 that has a medium earth orbit 20 and a low earth orbit satellite 21 with a low earth orbit 22. A MEO orbit altitude may range from about 10,000 km to about 20,000 km. A low earth orbit satellite system (not illustrated) is typically, deployed at an altitude below 1,500 km. Typically, several satellites are employed to form a system MEO or LEO system. MEO systems typically have 15 or greater satellites while LEO systems may have many times that number.

Referring now to FIG. 2, Earth 10 is illustrated with an inclined elliptical sub-geosynchronous satellite (SGSO) system 30 according to the present invention. The system 30 has a plurality of SGSO satellites 32, each satellite being positioned in a respective SGSO orbit 34. The satellites are active (communicating with the remainder of the system on the Earth) for a portion of the orbit 34. This period of activity is the active arc 35 which is illustrated in bold. Although not illustrated, each orbit 34 has an active arc.

A comparison of FIG. 1 and FIG. 2 illustrates some general differences between a GSO, MEO, LEO and the present invention SGSO. As Earth 10 rotates daily, GSO satellite 14 maintains a substantially constant position over the Earth. As seen from a point on the Earth, the elevation angle of the satellite is constant.

Although only illustrated on one orbit, each SGSO orbit 34 has an apogee 36 being set at the northernmost point of the orbit when viewed with respect to the Earth and an perigee 38 being the southernmost point of the orbit when viewed with respect to the Earth. The altitude of apogee 36 is greater than the altitude of a MEO satellite and may range from about 30,000 km to 50,000 km. The perigee 38 is preferably at least 500 km to avoid atmospheric drag.

Although four satellites are illustrated in FIG. 2, the above example is applicable to 2 or more satellites and preferably 4 or 5 satellite system having all the satellites synchronized so that continuous coverage may be provided to a service area. More satellites may be required if a larger service area, a higher elevation angle within the service area, or more capacity is desired. Applications in fixed satellite service, broadcast satellite service, or mobile satellite service may be more efficiently realized. As will be further described below, an initial group of satellites placed into orbit define an early or primary system. Thereafter, a second group of satellites may be added. This permits the benefit of a lower cost initial deployment with later deployments and therefore cost when the system requires it.

Referring now to FIG. 3, a high level diagram of a communications system 40 is shown. Communications system 40 includes satellites 42a and 42b and satellites 44a and 44b. Satellites 42a, 42b are used to direct communications signals 46 to a service area that is divided into a plurality of fixed sized cells 48. Satellites 44a, 44b are used to direct communications signals 50 to a service area that has fixed size cells 52. Communications signals 46, 50 may also be transmitted from fixed size cells 48, 52 to satellites 44a, 44b, 42a, 42b. Satellites 42a and 42b may be part of a first plurality of satellites deployed to be part of an initial early system. After the initial deployment, when further capacity is desired the satellites 44a and 44b may be part of a second deployment.

Satellites 42a, 42b, and 44a, 44b, are preferably in the inclined eccentric sub-geosynchronous orbit as described above. Although two satellites are illustrated for each service area, more than two satellites may be provided. Typically, only one satellite will provide coverage for a particular cell at a time. As illustrated, satellites 42a and 44a are providing coverage to cells 48 and 52, respectively. The system is designed so that when the elevation angle of satellites 42a and 44a become low, satellites 42b and 44b are at a proper elevation angle. A handover occurs and satellites 42b, 44b provide communication signals 46 and 50, respectively.

Communications system 40 is illustrated with ground stations 54 and 56. Ground stations 54 and 56 may be coupled to the terrestrial infrastructure such as an internet service provider 58, a broadcast TV center 60, or a corporate intranet 62. Of course, other terrestrial type communications may also be coupled to communications system 40 such as telephone networks or cellular telephone networks. One skilled in the art would recognize that ground stations 54 and 56 may be incorporated into a single centralized ground station or single location to provide common content and information for interactive data communications.

Communication system may employ a GSO satellite or satellites in addition to satellites 44a, 44b, 42a, 42b. The use of a GSO satellite depends on the overall use of the system as would be evident to those in the art.

Satellites 44a, 44b, 42a, 42b preferably have a phase array antenna 64. Various phase array antennae would be known to those skilled in the art. The advantage of the phase array antenna 64 is that beams with variable beamwidths may be used to obtain a substantially uniform cell size 48, 52 covering the respective service area. Thus, as the satellite moves within the service area the altitude and angle changes. The individual elements of the phase array antenna 64 may be reconfigured to keep the cell size on the face of the earth from each beam uniform. This feature is further described below.

Referring now to FIG. 4, as mentioned above, the number of satellites in an initial deployment may vary. A systematic approach to define the appropriate constellation of an SGSO system is described herein. The results shown in table form have been derived through a calculation of number of satellites and percentages of time in the active arcs. The results reflect that constellations have a variety of configurations based on the diversity of its assumptions.

An initial deployment SGSO system may be categorized into three classes based on the nature of the coverage. These classes are defined as (1) regional, (2) primary-market, and (3) landmass-optimized. The second and third classes are also known as the near-global (in contrast to the first) systems, their coverage expend to all longitudes from 180θW to 180θE. A true global (covering every longitude and latitude) system including pole coverage requires more satellites deployed than is needed by an SGSO system. The following paragraphs provide detail discussion of the three classes of initial deployment SGSO systems.

1. Regional

If the business requires only coverage to local/regional areas, say a country or a few neighboring countries, an SGSO system may provide coverage only to these areas. The simplest SGSO solution may use just one satellite in an inclined geosynchronous orbit to provide service. However, a better solution would apply at least two satellites, each of these satellites provides service through a repeatable ground track within an active period as a fraction of a day. When the active satellite is about to drop below the minimum elevation angle or is approaching the GSO satellite avoidance zone, a new active satellite will replace it. This process is called satellite handover. The constellation is defined by the joint constraints of coverage area, Doppler, minimum elevation, and the altitude of perigee.

2. Primary-Market

Figure 15:
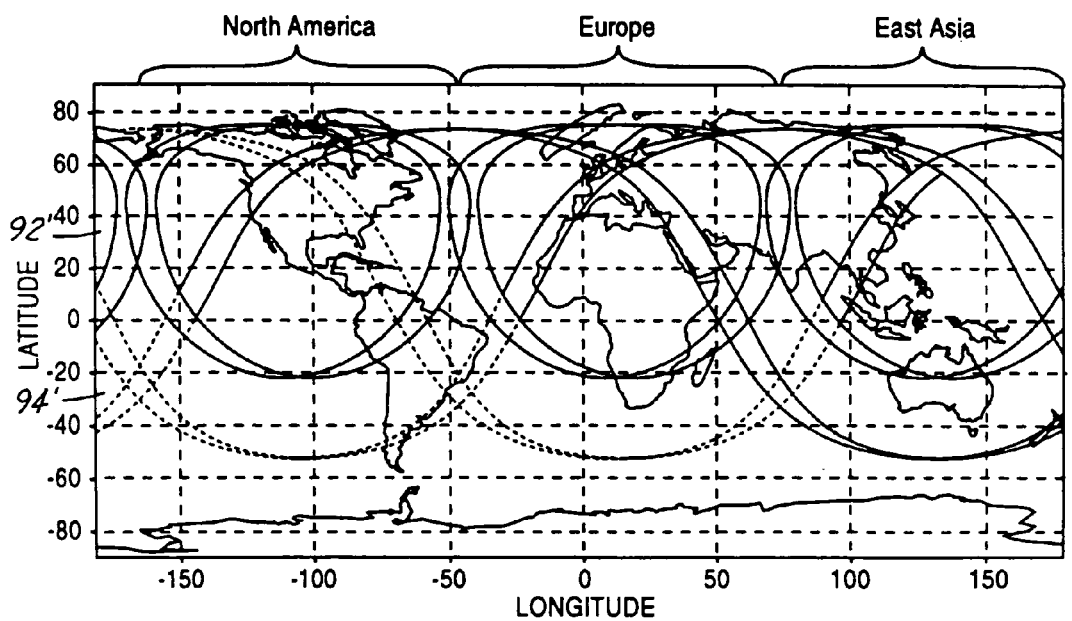
FIG. 15 is an equirectangular projection map of satellite coverage for a service area of a five satellite system according to the present invention.

If the business requires primary-market coverage, for example the popular developing/developed countries, an SGSO system that achieves primary-market coverage may start from only 3 SGSO satellites. These satellites will provide coverage concentrating to America and Asia As will be further described below, a better solution is a 5 satellites system, which provides both GSO arc avoidance and coverage concentrated to North America, Europe, and East Asia. These systems can be fine tune to provide coverage only to a few desired geo-locations. The resulting coverage is illustrated in FIG. 15. This may be performed in cooperation with the satellite(s) providing regional coverage using a second launch.

3. Landmass Optimized

Figure 12:
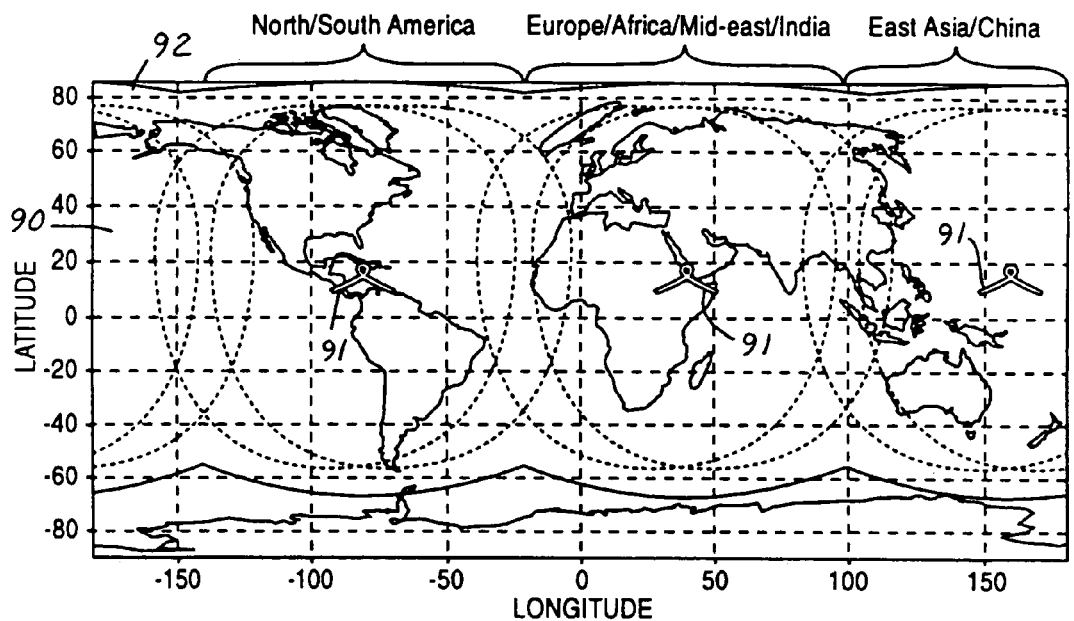
FIG. 12 is an equirectangular projection map of satellite coverage for a service area of a four satellite system according to the present invention.

At last, if the business requires optimized-landmass coverage, say most of the world, an SGSO system that achieves landmass-optimized coverage starts from 4 SGSO satellites as will be described below to cover all landmasses and requires much less satellites compared to a typical LEO or MEO system. The resulting coverage is illustrated in FIG. 12. This may be performed as a third launch in addition to the satellites of primary market coverage.

One parameter is the Orbit Period (or Period) which is defined as the time for a satellite to circulate one revolution in its orbit. The Period also determines whether the coverage is to be regional or global. Since the present invention is targeting simplicity, the selections introduced below are limited to orbits with repeatable ground tracks. To achieve repeatable ground tracks, Period is limited to be a rational fraction of a sidereal day (23.934469594 hours) and Period is given by, $$P(\text{Period})=N/M*100\%*S; M,N \square \{1, 2, 3, 4, \ldots\}, \text{ and } N<M \quad [1]$$

where M and N are integers, S is the length of a sidereal day, and N is smaller than M.

The number of repeatable ground tracks is the least common multiples (LCM) of M and N given by:

$$\text{Number of Repeatable Patterns}, K=LCM(M,N) \quad [2]$$

For simplicity, the numerator in equation [1] is equal to one (N=1). The Period is simplified to be a fraction of a sidereal day (1/M*S). As a result, the number of repeatable sub-tracks (K) is M, in the ground track pattern plot. It is assumed that at least one active satellite is present at each sub-track.

The minimum number of required satellites is given by:

$$\text{Minimum Required Number of Satellite } K=LCM(1,M)=M \quad [3]$$

Assuming that the number of total satellites is defined as X. X includes K minimum required satellites and Y redundant satellites that fill the gaps between adjacent active arc. The number of total satellites can be summarized as:

$$\text{Number of Total Satellites } X=K(\text{minimum required})+Y(\text{redundant}) \quad [4]$$

The percentage of time in active arc (Active Period) is equivalent to the ratio of number of active satellites over all satellites if the Active Period is defined to provide no redundancy (one active satellite only in each arc). This ratio is calculated by:

$$\text{Active Period Percentage}=\text{Active\_Period}/\text{Period}*100\%=K/X*100\% \quad [5]$$

In a preferred embodiment, a few constellation design constraints are applied in the selection of SGSO constellations. These constraints limit the selection of SGSO constellation under a few sub-sets of all SGSO constellations. These constraints include:

[1] Altitude of perigee: larger than 500 km to avoid wind drag

[2] Minimum elevation: larger than 10 degree, and the higher the better

[3] Continuous coverage: at least one visible satellite for 100% of time to secure acceptable quality of service

[4] Total number of spacecraft should be a number that provides sufficient coverage at specific elevation angles. In preferred systems, the total number is less than less than 8.

Other secondary constraints may not be achieved at all time compared to the primary constraints. These constrains are listed below as secondary constraints and serve as objectives for quality of service:

[5] Non-interfering with GSO links: the constellation is designed to avoid main-beam-to-main-beam interference with GSO networks/systems, typical solution is to achieve satellite diversity with GSO arc.

[6] Van Allen Belt Avoidance: there are two zones with highly dense radiating articles, such as protons and electrons, trapped at certain altitudes called Van Allen Belts. The considered SGSO satellite may fly through these areas from time-to-time, special protection to payload electronics are required if the orbit pass one of the Van Allen Belts or both. As is illustrated in the table, preferably the system of the present invention employs less than nine satellites and more preferably uses four or five satellites.

Figure 5:
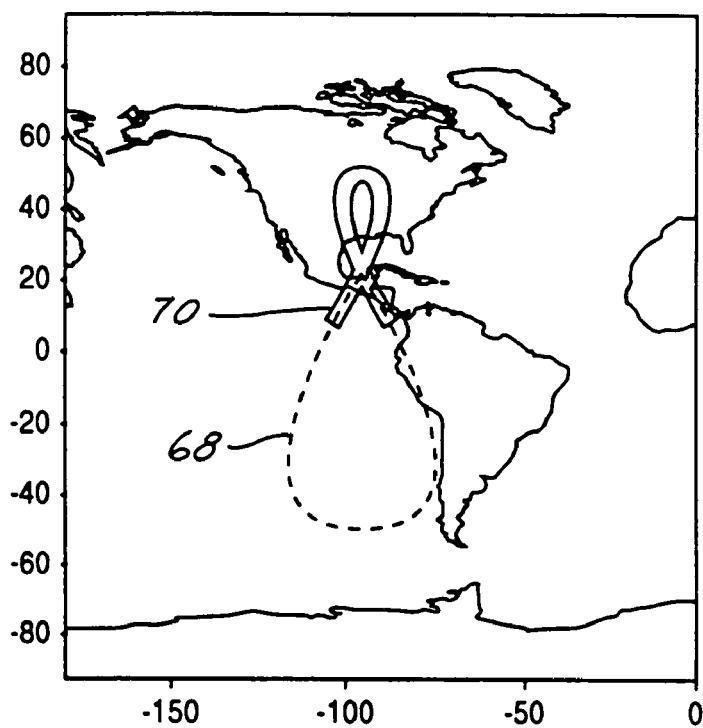
FIG. 5 is plot of a ground track of case one of FIG. 4, wherein thicker curve indicates the portion within an active period of 12 hours.

Referring now to FIG. 5, Case 1 from the table of FIG. 4 is illustrated. A ground track 68 having an active arc 70 is illustrated over North America. Because only two satellites are used, this system provides only regional coverage but has advantageously an extremely high elevation angle. A ground track on the surface of Earth 10 may be developed from SGSO satellite 32. Ground tracks are imaginary lines representing the loci of subsatellite points that are repeatedly traced on the surface of the Earth by lines extending from the center of the Earth to orbiting satellites. The ground tracks are located at specified longitudes and retrace repeatedly on a regular basis.

Figure 6:
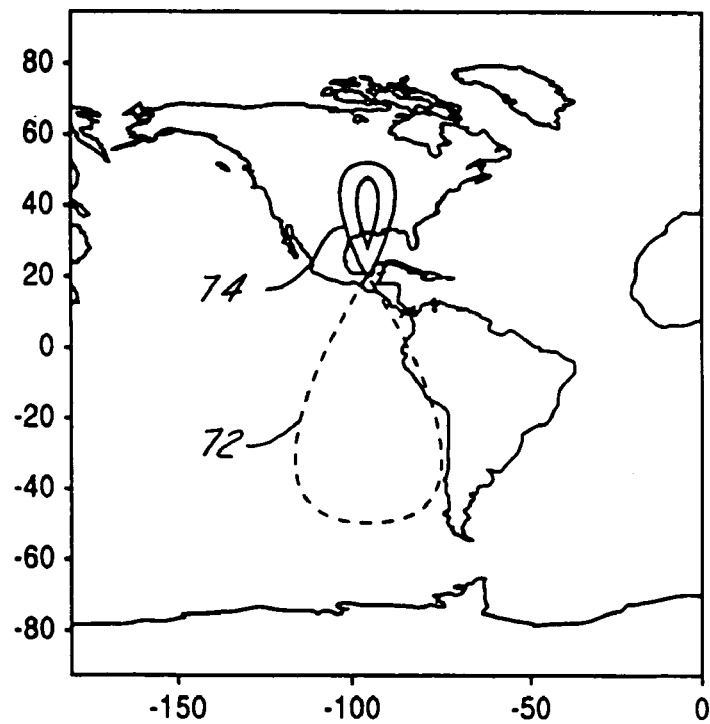
FIG. 6 is plot of a ground track of case two of FIG. 4, wherein thicker curve indicate the portion within an active period of 8 hours.

Referring now to FIG. 6, Case 2 from the table of FIG. 4 is illustrated. A ground track 72 having an active arc 74 is illustrated over North America. Because only three satellites are used, this system provides only regional coverage but has advantageously an extremely high elevation angle and no interference with the geostationary belt.

Figure 7:
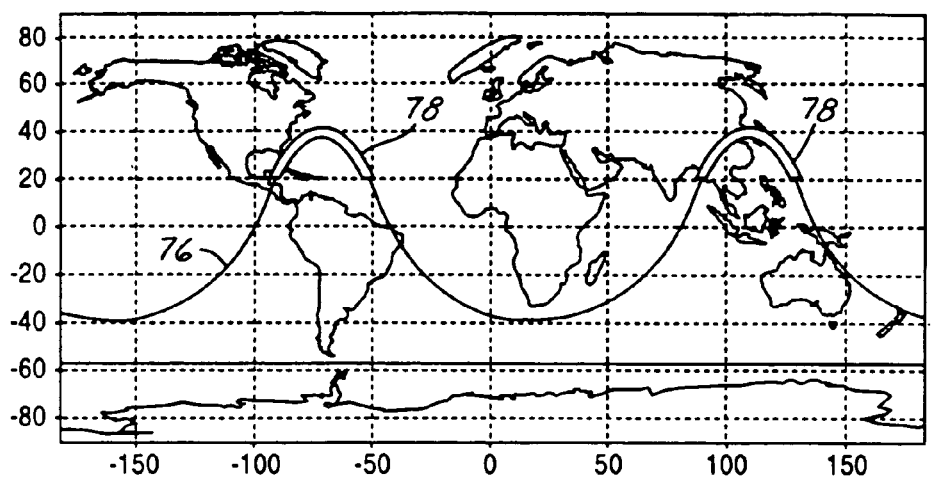
FIG. 7 is plot of a ground track of case three of FIG. 4, wherein thicker curve indicate the portion within an active period of 16 hours.

Referring now to FIG. 7, Case 3 from the table of FIG. 4 is illustrated. A ground track 76 having active arcs 78 are illustrated over a global map. Because the only three satellites, two of which are active, are used, this system provides two regions of coverage with an advantageously high elevation angle.

Figure 8:
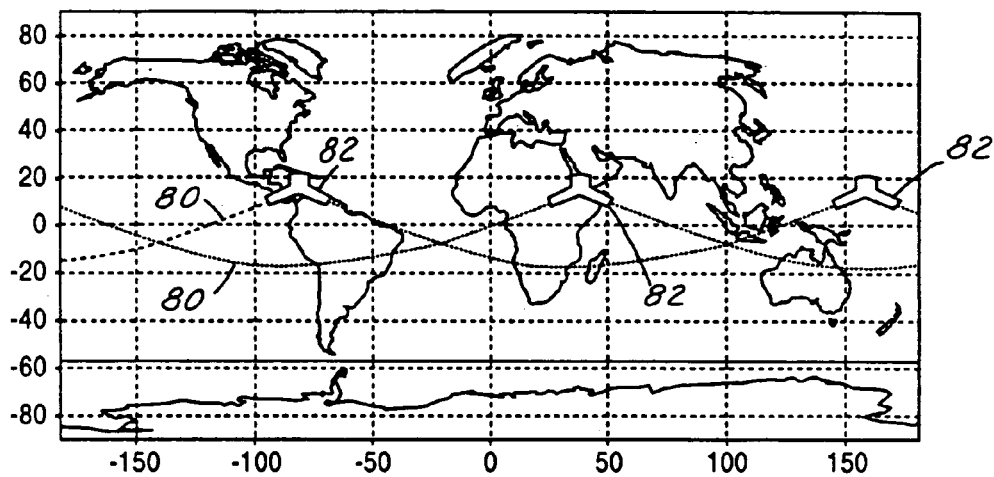
FIG. 8 is plot of a ground track of case five of FIG. 4, wherein thicker curve indicate the portion within an active period of 18 hours.

Referring now to FIG. 8, Case 5 from the table of FIG. 4 is illustrated. A ground track 80 having active arcs 82 are illustrated over a global map. Because four satellites, three of which are active, are used, this system provides three regions of coverage with an advantageously high elevation angle. This system provides near global coverage and is further described below.

Figure 9:
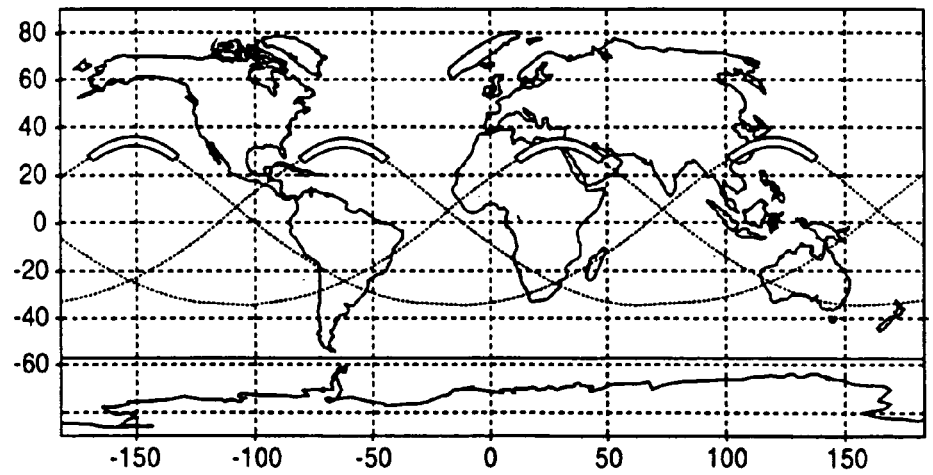
FIG. 9 is plot of a ground track of case eight of FIG. 4, wherein thicker curve indicate the portion within an active period of 19.2 hours.

Referring now to FIG. 9, Case 6 from the table of FIG. 4 is illustrated. A ground track 84 having active arcs 86 are illustrated over a global map. Because five satellites, four of which are active, are used, this system provides four regions of coverage and less potential interference with satellites in the GSO belt. This system provides near global coverage with higher elevation angles than those of case 5.

Figure 10:
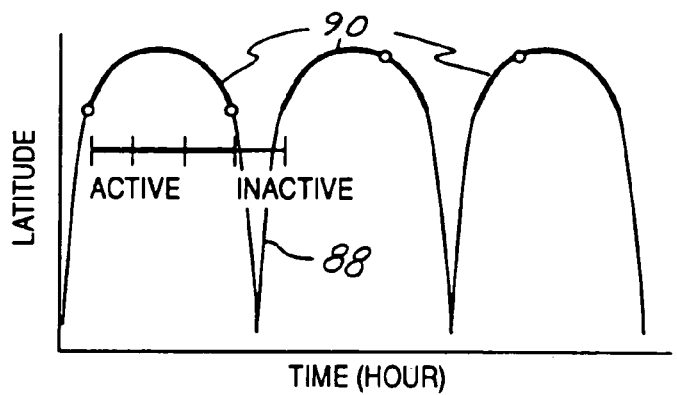
FIG. 10 is a plot of latitude versus time plot of a four satellite system according to the present invention.
Figure 11:
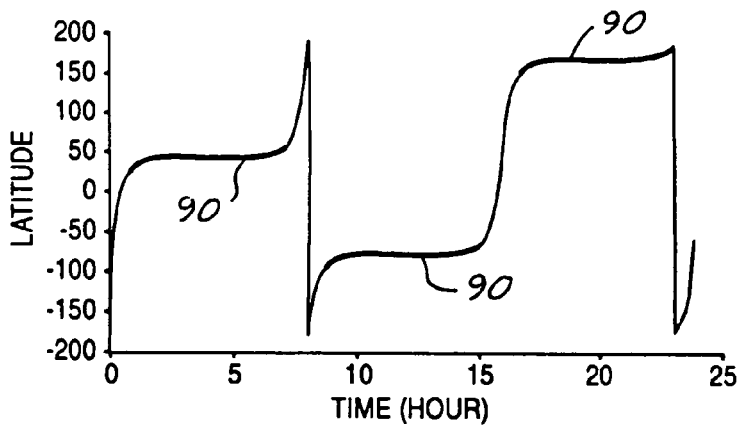
FIG. 11 is a plot of longitude versus time plot of a four satellite system according to the present invention.

Referring now to FIG. 10, a first example of a preferable system of the present invention using 4 satellites in Elliptical Sub-Geosynchronous Orbit (SGSO) with period around 8 hours (one third of sidereal day) is illustrated. The latitude versus time plot has a line 88 showing how the latitude varies with respect to time. Line 88 has active arcs 90 illustrating when the satellite is active versus inactive. Each satellite spends three quarters of the period time in an active period and one quarter in maneuvering between two consecutive active periods. As shown in FIG. 11, the positions of longitude of each satellite along line 91 are shown with active arcs 90 in bold.

Referring now to FIG. 12, overall coverage and subsatellite tracks 91 in active periods are shown. It demonstrates an optimized coverage of the global landmass by just four SGSO satellites. This result out-performs that achieved by any GSO alternative in the high latitude area. LEO or MEO, would involve at least 10 MEO satellites or 30 LEO satellites for an equivalent global coverage. The region 92 in the center of the map represents the region with at least 10 degrees of elevation angle. As is illustrated, this includes nearly all the primary markets. Another region 94 directly adjacent to region 90 illustrates the region between 10 degrees of elevation angle and zero degrees of elevation angle. A no service region 96 is illustrated directly adjacent to region 96. The no service region 96 is directly adjacent to each pole.

Another advantage of the present invention is that the terminals track satellites in a semi-geostationary manner using scanning angles of less than 20°.

As shown, the landmasses of the earth may be separated as three zones [1] North and South America, [2] Europe, Africa, Mid-East and India, and [3] China, East Asia, Australia, and New Zealand. Each zone would have only a dedicated active satellite at each moment. For business, which involves geographically closer communication, this arrangement would be a great benefit since a satellite can see the whole landmass in each zone and no inter-satellite link is necessary. For business which involves transoceanic communication (US-Asia, US-Europe, and Europe-Asia), the inter-continent traffic may be carried either through partnering with the undersea cable or the long-haul fiber companies. An optical intersatellite link (ISL) may also be used. Inter-satellite-links (ISL) however, may not be considered because of a correspondingly long development time. If the constraint of short "time-to-market" period is present, the undersea cable aspect may be more easily implemented than an ISL.

Figure 13:
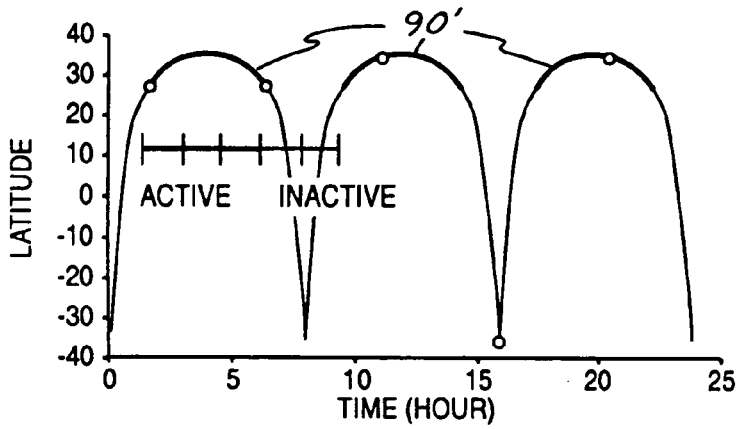
FIG. 13 is a plot of latitude versus time plot of a five satellite system according to the present invention.
Figure 14:
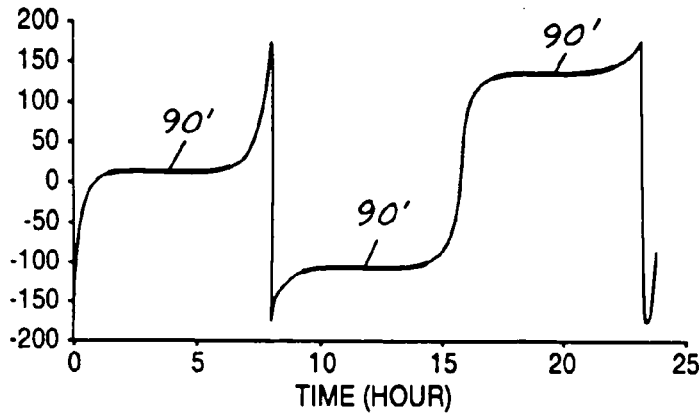
FIG. 14 is a plot of longitude versus time plot of a five satellite system according to the present invention.

Referring now to FIG. 13, similar concept to that shown in FIGS. 10–12 may be applied for a "primary-market" system. As shown in, the areas that demand the highest capacity, North America, Europe, and East Asia, are covered at high elevation angle of 30θ through 5 ESGO satellites. Each satellite dwells in active period for 60% of the time period and maneuvers between adjacent active slots for the remaining 40% of the time period. In FIG. 13, active arcs 92' are shorter than arcs 92 from FIG. 10. FIG. 14 is a plot of longitude versus time for the system of FIG. 13.

With 5 satellites, 8-hour period, and 3 active zones, the altitude within each zone varies from about 18000 km to about 27,270 km. One advantage of the system is that the scanning angle decreases from +/−16θ to +/−11θ, while the satellite altitude increases from 18,000 km to 27,025 km. The region 92' in the center of the map represents the region with at least 10 degrees of elevation angle. As is illustrated, this includes nearly all the primary markets. Another region 94' directly adjacent to region 90' illustrates the region between 10 degrees of elevation angle and zero degrees of elevation angle. A no service region 96' is illustrated directly adjacent to region 96'. The no service region 96' is directly adjacent to each pole.

Figure 16:
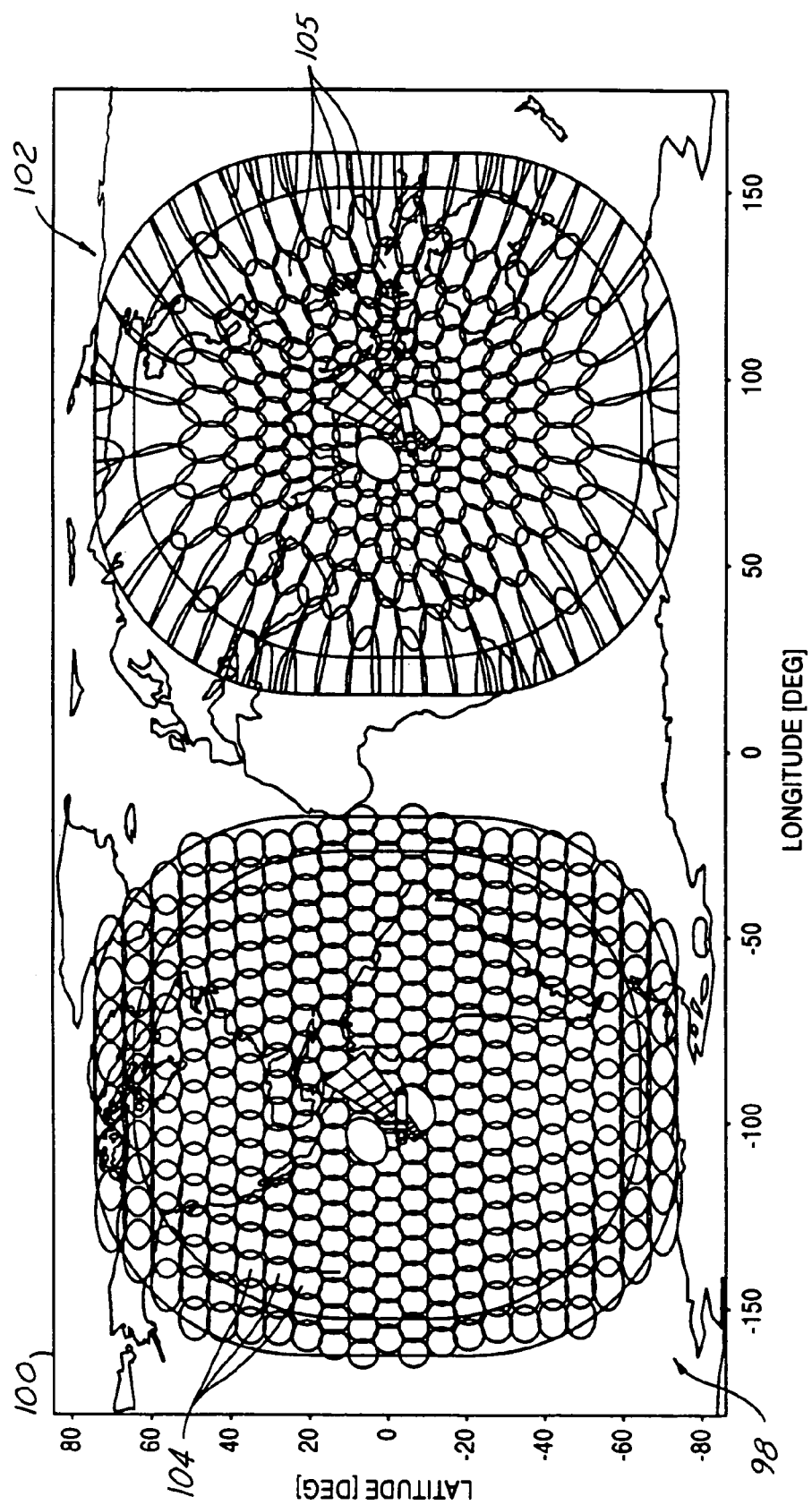
FIG. 16 is an equirectangular projection map of satellite coverage showing variable beam width in fixed cell sizes according to the present invention for a service area in contrast to a fixed beam width system of the prior art.

Referring now to FIG. 16, due to the variation in altitude of the SGSO satellites, it is desirable to apply coverage as fixed-cell-varying-beamwidth as illustrated as region 98 with cells 104 on rectilinear map 100 instead of fixed-beamwidth-varying-cell as illustrated as region 102 with cells 105 on map 100.

Figure 17B:
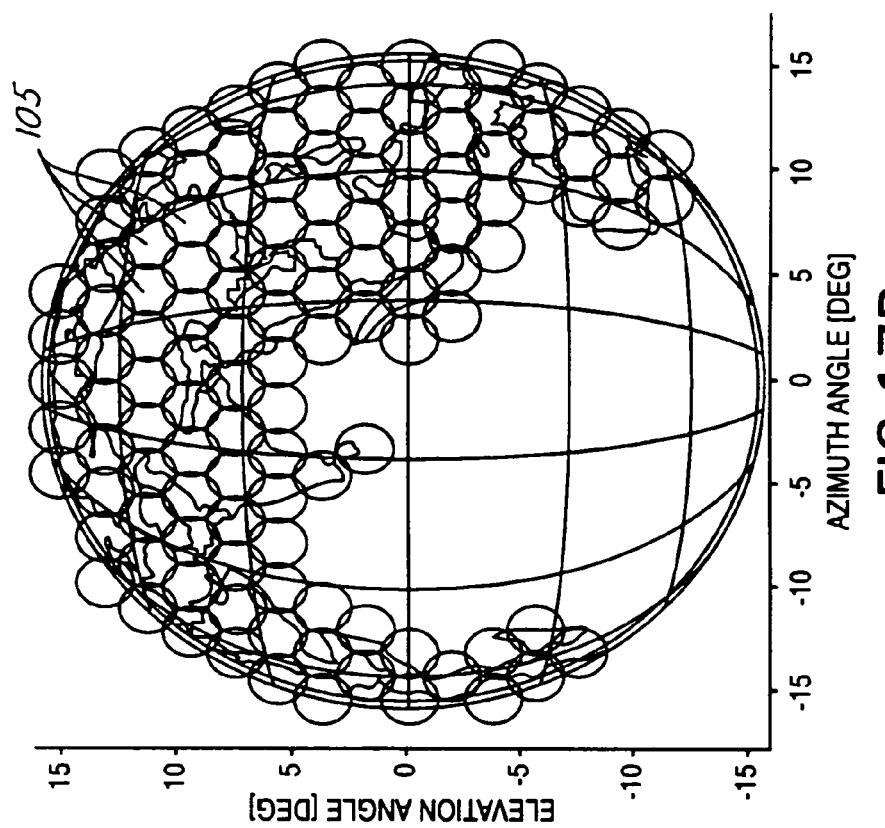
FIG. 17B is a perspective view from a satellite showing for a service area having fixed beam width system of the prior art.
Figure 17A:
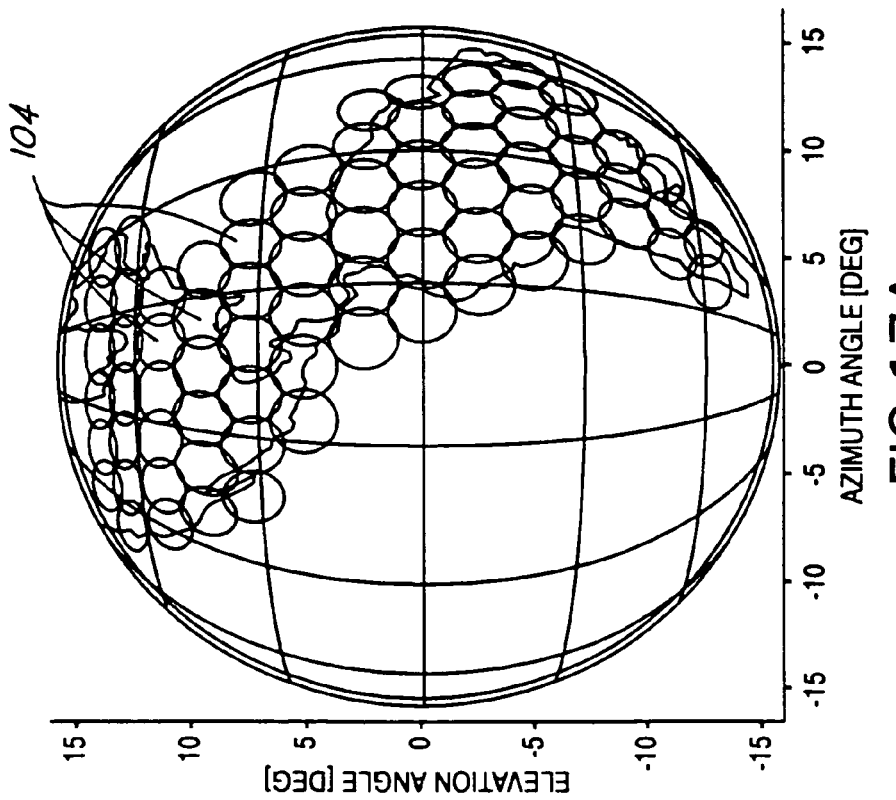
FIG. 17A is a perspective view from a satellite showing variable beam width in fixed cell sizes according to the present invention.

Another comparison is shown below in FIGS. 17A and 17B. A satellite centric view is illustrated showing a system having varying beamwidth and fixed cells 104 in FIG. 17A and a system with fixed beamwidth and varying size cells 105 in FIG. 17B.

As is illustrated, each cell is not only equal in size but also is fixed relative to the motion of satellites. The cell size selection may vary in each system when balanced with design tradeoffs in EIRP, antenna complexity, and intended coverage areas. To implement such a system, a phase array based satellite antenna with 500 to 1500 elements may be used.

Figure 18:
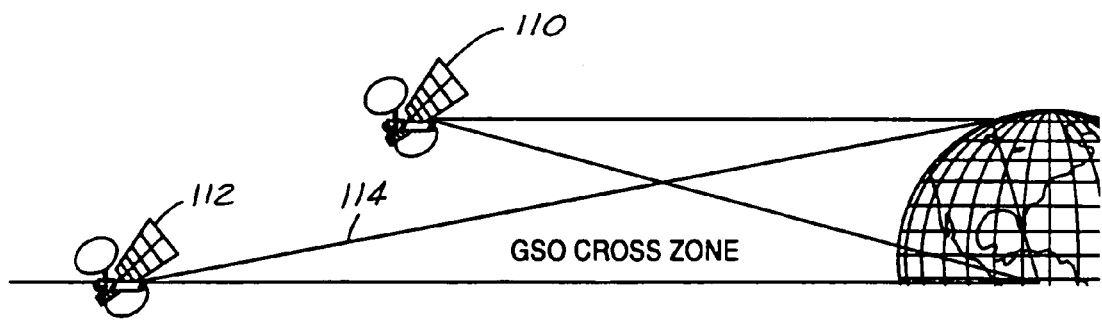
FIG. 18 is a view of the earth having a geostationary crossing zone with respect to an SGSO satellite according to the present invention.

Referring now to FIG. 18, an important feature for SGSO satellites 110 system of the present invention is to share spectrum with GSO satellites 112 to avoid SGSO sidelobe interference into the GSO earth station at its mainbeam. As a result, a GSO Crossing Zone Avoidance is defined which indicates the SGSO satellites would shut-down while flying through the defined GSO Crossing Zone 114.

SGSO is one of the simplest solutions to achieve GSO Crossing Zone Avoidance. Assuming a system with 5 SGSO satellites is considered, the active arc is outside the GSO Crossing Zone. This means the SGSO satellite sidelobe would not interfere any GSO Earth station at its mainbeam. The active SGSO satellite is widely separated from the GSO satellite seen from anywhere on the earth surface.

While the invention has been described in detail, those familiar with the art to which this invention relates will recognize various alternative designs and embodiments for practicing the invention as defined by the following claims.

What is claimed is:

1. A communications system comprising:
   a plurality of regional ground stations;
   a plurality of satellites located in a elliptical sub-geosynchronous orbit with respect to the earth, said satellites operating in a service area in a synchronized manner to provide continuous coverage to said service area, said satellites generating a plurality of beams with widths that vary relative to position in the orbit to obtain a substantially uniform cell size covering said service area; and
   a plurality of user terminals with the service area receiving communication signals from the satellite.

2. A system as recited in claim 1 wherein said ground station is coupled to one selected from the group consisting of an internet service provider, a broadcast television center and a corporate internet.

3. A communications system as recited in claim 1 wherein said uniform cells are substantially fixed within said service area.

4. A communications system as recited in claim 1 wherein said plurality of beams provide equal capacity density to said cell size.

5. A communications system as recited in claim 1 wherein said sub-geosynchronous orbit has a minimum elevation angle is greater than 10 degrees in said service area.

6. A communications system as recited in claim 1 wherein within said service area is a primary market area.

7. A communications system as recited in claim 1 wherein said plurality of satellites comprise a phased array to form said plurality of beams.

8. A communications system as recited in claim 1 wherein said first plurality of satellites arc disabled when coextensive with a geostationary orbit.

9. A communications system as recited in claim 1 wherein said plurality comprises less than 9 satellites.

10. A communications system as recited in claim 1 wherein said plurality comprises 4 satellites.

11. A communications system as recited in claim 1 wherein said plurality comprises 5 satellites.

12. A communications system comprising:
a first plurality of satellites located in an elliptical sub-geosynchronous orbit with respect to the earth, said satellites operating in a service area in a synchronized manner to provide continuous coverage to said service area, said satellites generating a plurality of beams with widths that vary relative to position in the orbit to obtain a substantially uniform cell size covering said service area, said first plurality of satellites providing a first system capacity; and
a second plurality of satellites deployed after said first plurality of satellites, said second plurality of satellites providing a second system capacity greater than the first system capacity.

13. A communications system as recited in claim 12 wherein said uniform cells are substantially fixed within said service area.

14. A communications system as recited in claim 12 wherein said plurality of beams provide equal capacity density to said cell size.

15. A communications system as recited in clam 12 wherein said minimum elevation angle is greater than 10 degrees in said service area.

16. A communications system as recited in claim 12 wherein within said service area is a primary market area having an elevation greater than 30°.

17. A communications system as recited in claim 12 wherein said first plurality of satellites comprise a phase array to form said plurality of beams.

18. A communications system as recited in claim 12 wherein said satellites are disabled when coextensive with a geostationary orbit.

19. A communications system as recited in claim 12 wherein said first plurality comprises less than 9 satellites.

20. A communications system as recited in claim 12 wherein said first plurality comprises 4 satellites.

21. A communications system as recited in claim 12 wherein said first plurality comprises 5 satellites.

22. A communications system as recited in claim 12 wherein said orbit is an inclined eccentric sub-geosynchronous orbit.

23. A method of developing a customized satellite constellation comprising the steps of:
developing a first satellite constellation having a first set of satellites having regional coverage having a first service area, said first constellation comprises a first plurality of satellites located in a elliptical sub-geosynchronous orbit with respect to the earth, said satellites operating in a service area in a synchronized manner to provide continuous coverage to said service area, said satellites generating a plurality of beams with variable beam widths formed as a function of orbit position to obtain a substantially uniform cell size covering said service area;
launching a second set of satellites to form a second satellite constellation having primary market coverage in cooperation with said first set of satellites to have a second service area greater than said first service area.

24. A method as recited in claim 23 comprising launching a third set of satellites to form a third satellite constellation having optimized landmass coverage in cooperation with said first set of satellites and said second set of satellites having a third service area greater than said second service area.

25. A method as recited in claim 23 wherein said first constellation, said second constellation and said third constellation comprise SGSO satellites.

26. A method as recited in claim 23 wherein said first set of satellites are non-interfering with GSO satellites.

27. A method as recited in claim 23 wherein said second set of satellites are non-interfering with GSO satellites.

28. A method as recited in claim 23 wherein said first plurality of satellites and said second set of satellites have active arcs sized to provide continuous coverage to said second service area.

29. A method as recited in claim 23 wherein said first plurality of satellites and said second set of satellites have active arcs sized to be non-interfering with GSO satellites.

30. A communications system comprising;
a plurality of regional ground stations;
a plurality of satellites located in a elliptical sub-geosynchronous orbit with respect to the earth, said satellites operating in a service area in a synchronized manner to provide continuous coverage to said service area, said satellites generating a plurality of beams with variable beam widths that vary as a function of orbital position to obtain a substantially uniform cell size covering said service area; and
a plurality of user terminals with the service area receiving communication signals from the satellite.

31. A communications system as recited in claim 30 wherein said plurality of satellites operate using a frequency of a GSO satellite.

32. A communications system as recited in claim 31 wherein said plurality of satellites not operating in a GSO satellite avoidance zone.

* * * * *